United States Patent
Suga

(10) Patent No.: US 11,945,498 B2
(45) Date of Patent: Apr. 2, 2024

(54) WORK VEHICLE

(71) Applicant: KUBOTA CORPORATION, Osaka (JP)

(72) Inventor: Hiroki Suga, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 451 days.

(21) Appl. No.: 17/295,890

(22) PCT Filed: Dec. 11, 2019

(86) PCT No.: PCT/JP2019/048371
§ 371 (c)(1),
(2) Date: May 21, 2021

(87) PCT Pub. No.: WO2020/129760
PCT Pub. Date: Jun. 25, 2020

(65) Prior Publication Data
US 2022/0126916 A1  Apr. 28, 2022

(30) Foreign Application Priority Data

Dec. 20, 2018 (JP) ................................ 2018-238894

(51) Int. Cl.
*B62D 15/02* (2006.01)
*B60K 35/00* (2006.01)
(Continued)

(52) U.S. Cl.
CPC .............. *B62D 15/02* (2013.01); *B60K 35/00* (2013.01); *B60K 35/22* (2024.01); *B62D 1/04* (2013.01)

(58) Field of Classification Search
CPC .......... B62D 15/02; B62D 1/04; B60K 35/00; B60K 2370/152
See application file for complete search history.

(56) References Cited

U.S. PATENT DOCUMENTS

2008/0183354 A1  7/2008  Higashi et al.
2010/0188198 A1  7/2010  Takeuchi
(Continued)

FOREIGN PATENT DOCUMENTS

DE  10 2014 226 615 A1  6/2016
JP  2002225724 A  *  8/2002
(Continued)

OTHER PUBLICATIONS

English translation of JP-2002225724-A (Year: 2002).*
(Continued)

*Primary Examiner* — Anshul Sood
*Assistant Examiner* — Matthew Ho
(74) *Attorney, Agent, or Firm* — Keating & Bennett, LLP

(57) ABSTRACT

A work vehicle includes a steering wheel on a rear side with respect to a display, in front of a driver seat, and that includes spokes and a ring-shaped portion connected to the spokes. An opening is between the spokes and the ring-shaped portion. The work vehicle further includes a steering controller to change a steering angle of a steerable wheel based on a wheel angle that is a rotation angle of the steering wheel about a wheel rotation shaft, and an adjuster to adjust a relationship between the wheel angle and the steering angle.

3 Claims, 6 Drawing Sheets

(51) Int. Cl.
*B60K 35/22* (2024.01)
*B62D 1/04* (2006.01)

(56) References Cited

U.S. PATENT DOCUMENTS

| | | |
|---|---|---|
| 2014/0062075 A1 | 3/2014 | Tsuchihashi et al. |
| 2018/0244299 A1 | 8/2018 | McWilliams et al. |
| 2018/0281845 A1 | 10/2018 | Wijffels et al. |

FOREIGN PATENT DOCUMENTS

| | | | |
|---|---|---|---|
| JP | 2007001426 A | * | 1/2007 |
| JP | 2007-203761 A | | 8/2007 |
| JP | 2010-173410 A | | 8/2010 |
| JP | 2012-060909 A | | 3/2012 |
| JP | 5704869 B2 | | 4/2015 |
| WO | 2006/137991 A1 | | 12/2006 |
| WO | 2007/019864 A1 | | 2/2007 |

OTHER PUBLICATIONS

English translation of JP-2007001426-A (Year: 2007).*
Official Communication issued in corresponding European Patent Application No. 19900209.8, dated Sep. 9, 2022.
Official Communication issued in International Patent Application No. PCT/JP2019/048371, dated Mar. 3, 2020.
Official Communication issued in corresponding Indian Patent Application No. 202147022049, dated Oct. 1, 2021.

* cited by examiner

WORK VEHICLE

BACKGROUND OF THE INVENTION

1. Field of the Invention

The present invention relates to a work vehicle in which a steering wheel for operating a steerable wheel is disposed between a driver seat and a display unit for displaying various types of information.

2. Description of the Related Art

JP 2013-252073A (or US 2014/062075A1) discloses a work vehicle in which a flat panel display unit is disposed on a steering post and a steering wheel is attached to a steering shaft that extends upward from the steering post. The steering wheel is constituted by a ring and a plurality of spokes that extend in the radial direction of the ring, and an opening is formed by the ring and adjacent spokes. The size of the opening and the position of the flat panel display unit are determined such that a driver seated on the driver seat can see the flat panel display unit through the opening. Therefore, the driver can have a clear view of the screen of the flat panel display unit through the opening of the steering wheel.

SUMMARY OF THE INVENTION

Work vehicles mainly travel in a straight line, and therefore, in the work vehicle disclosed in JP 2013-252073A (or US 2014/062075A1), the attachment position of the steering wheel is determined such that the driver can have a clear view of the screen of the flat panel display unit through the opening of the steering wheel when the rotation position of the steering wheel is that of straight travel. However, an original correct relationship between a wheel angle, which is the rotation angle of the steering wheel, and a steering angle of a steerable wheel cannot be maintained in a steering mechanism for converting the wheel angle to the steering angle, due to change over time or the like. As a result, the wheel angle of straight travel shifts in the clockwise or counterclockwise direction from an original angle, the field of view is interrupted by a spoke, and the driver cannot see the entire screen of the flat panel display unit through the opening of the steering wheel.

Under the above circumstances, there is demand for a work vehicle that allows the driver to have a clear view of the screen of the flat panel display unit through the opening of the steering wheel regardless of change over time in the steering mechanism.

A work vehicle according to the present invention includes: a driver seat; a steerable wheel; a display unit configured to display various types of information; a steering wheel disposed on the rear side with respect to the display unit, in front of the driver seat; a wheel angle detector configured to detect a wheel angle that is a rotation angle of the steering wheel about a wheel rotation shaft; a steering mechanism configured to change a steering angle of the steerable wheel based on the wheel angle; and an adjusting unit configured to adjust a relationship between the wheel angle and the steering angle. The steering wheel includes a plurality of spokes and a ring-shaped member that is connected to the spokes, and an opening is formed between the spokes and the ring-shaped member.

The steering mechanism sets a wheel angle (relationship between the wheel angle and the steering angle) of an initial state in which the display unit can be seen from the driver seat side through the opening of the steering wheel, as the wheel angle of the steering wheel that generates a steering angle (straight travel steering angle) that makes the steerable wheel travel straight. When the initial state changes, a view of the display unit from the driver seat side is interrupted by a spoke when the steering wheel is at the rotation position at which the straight travel steering angle (commonly called a neutral steering angle) is generated. In such a case, according to the configuration of the present invention, it is possible to restore the original initial state by adjusting the relationship between the wheel angle and the steering angle through the adjusting unit.

In a preferred embodiment of the present invention, the adjusting unit is configured to set, as an appropriate angle, a wheel angle that allows the display unit to be in a field of view from the driver seat side through the opening, and adjust the relationship such that the steering angle becomes the neutral steering angle when the wheel angle is the appropriate angle. In this configuration, the wheel angle that allows the display unit to be seen from the driver seat side through the opening of the steering wheel is set as the appropriate angle, and the steering mechanism is adjusted through the adjusting unit such that the appropriate angle corresponds to the neutral steering angle. As a result, the driver seated on the driver seat can always have a clear view of the screen of the flat panel display unit through the opening of the steering wheel.

In a preferred embodiment of the present invention, the appropriate angle is stored in advance, the adjusting unit reads out the stored appropriate angle, and adjusts the steering mechanism based on the read appropriate angle such that the steering angle becomes the neutral steering angle. With this configuration, the adjusting unit can automatically adjust the steering mechanism at a predetermined timing or based on a request from the driver such that the display unit is in the field of view of the driver from the driver seat side through the opening when the work vehicle is traveling in a straight line.

In a preferred embodiment of the present invention, the adjusting unit sets, as the appropriate angle, a rotation angle of the steering wheel at a point in time at which a manual operation tool for setting the appropriate angle is operated, and adjusts the steering mechanism such that the steering angle becomes the neutral steering angle when the wheel angle is the appropriate angle. With this configuration, the steering angle that makes the steerable wheel travel straight is generated from the wheel angle of the steering wheel at the time when the driver feels that it is easy to see the display unit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
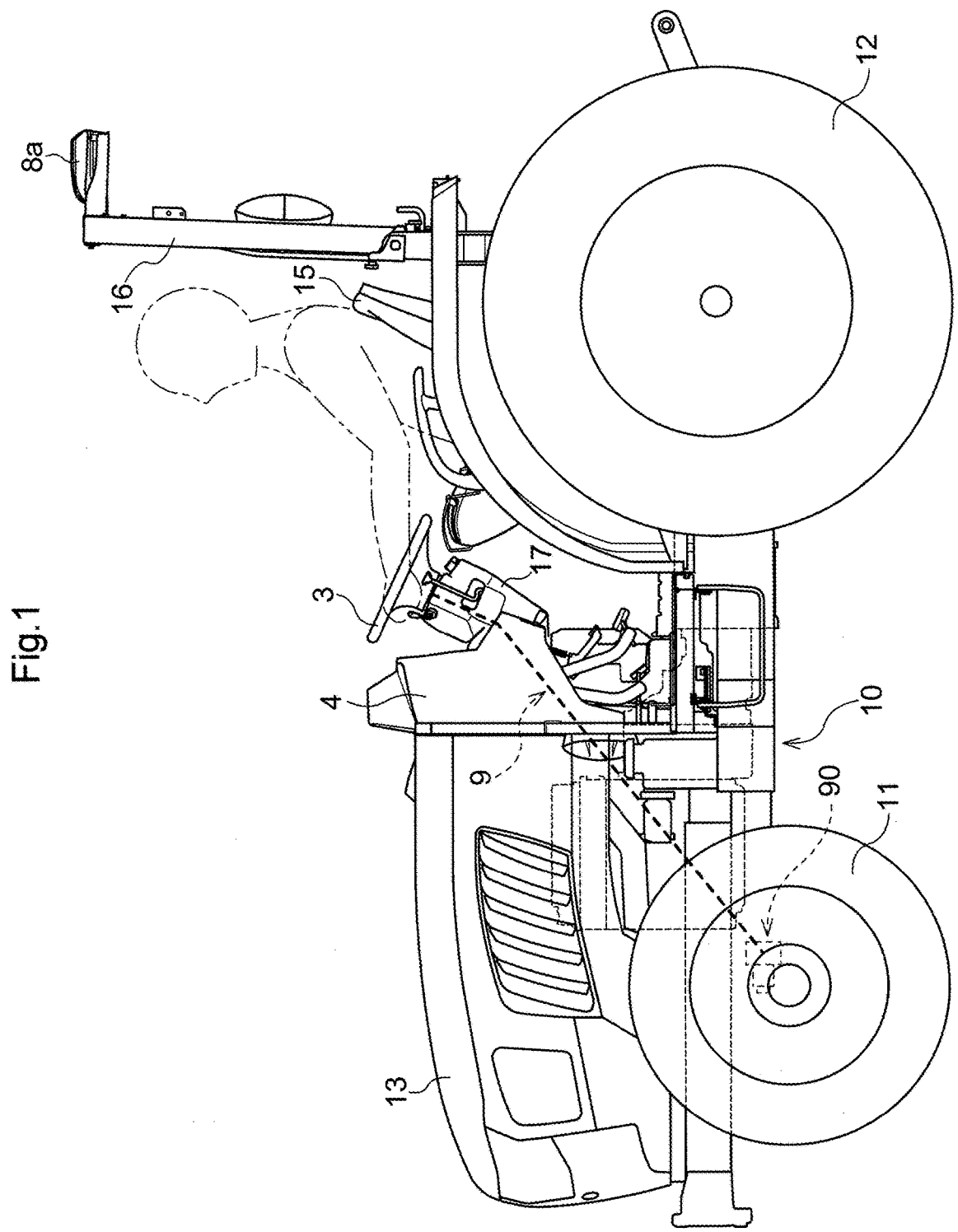
FIG. 1 is a side view of a tractor.
Figure 2:
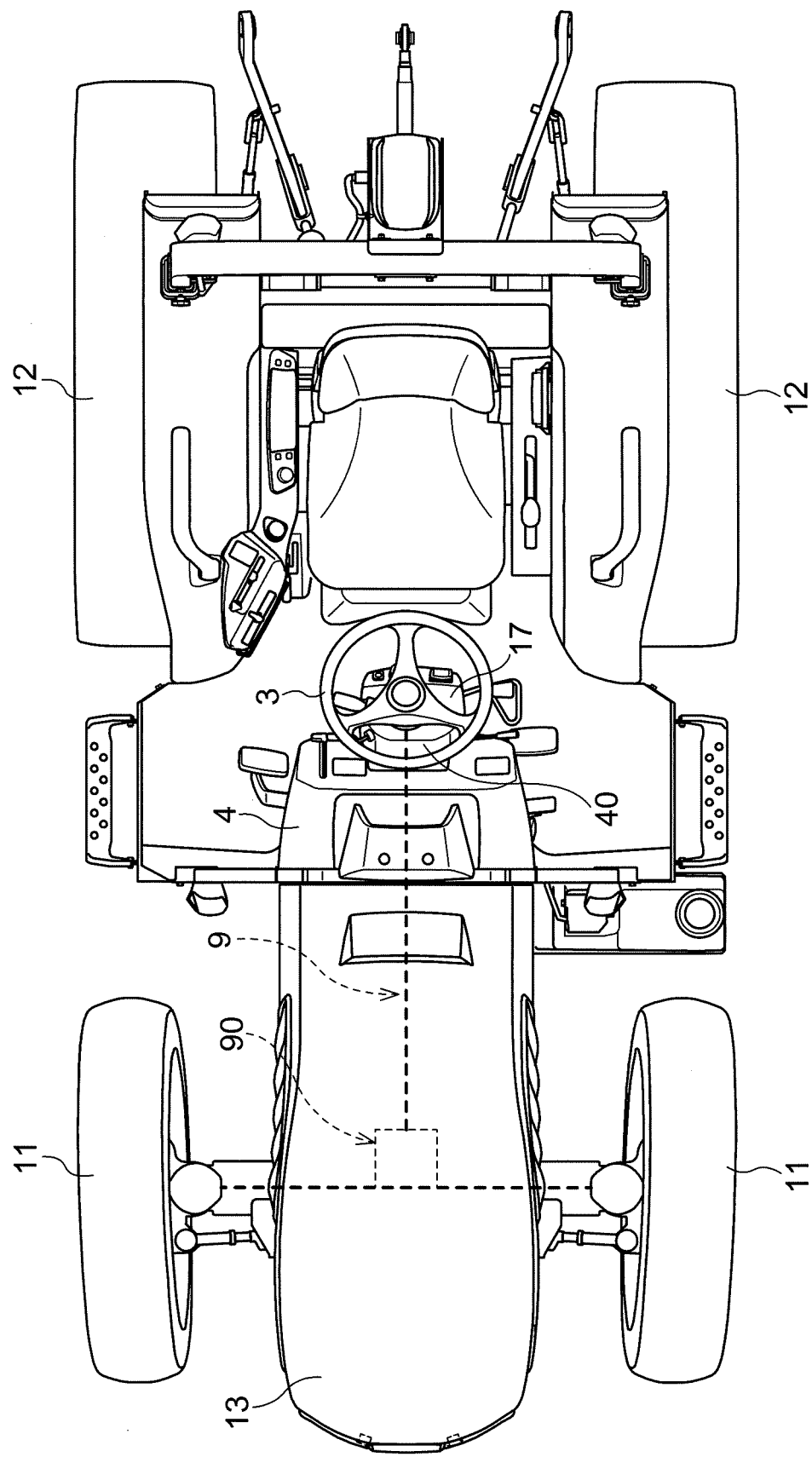
FIG. 2 is a plan view of the tractor.

Next, a preferred embodiment of a work vehicle according to the present invention will be described using the drawings. FIG. 1 is a side view of a tractor that is an example of the work vehicle, and FIG. 2 is a plan view of the tractor. As shown in FIG. 1, in the tractor, a hood 13 that covers an engine compartment is disposed in a front region of a vehicle body 10 that is supported by front wheels 11 and rear wheels 12, and a driver seat 15 and a ROPS 16 are disposed in a rear region of the vehicle body 10. The front wheels 11 are configured as steerable wheels, and the rear wheels 12 are configured as driving wheels. In a four-wheel drive mode, the front wheels 11 also function as driving wheels. A panel assembly 4 is disposed at the rear end of the hood 13, and a steering wheel 3 is disposed between the panel assembly 4 and the driver seat 15. The steering wheel 3 is supported by a steering post 17 that is connected to the panel assembly 4. Various operation tools and various meters are attached to the panel assembly 4. As shown in FIG. 2, a display unit 40 for displaying various types of information is disposed on the lower front side of the steering wheel 3. The display unit 40 is attached to the panel assembly 4.

Figure 3:
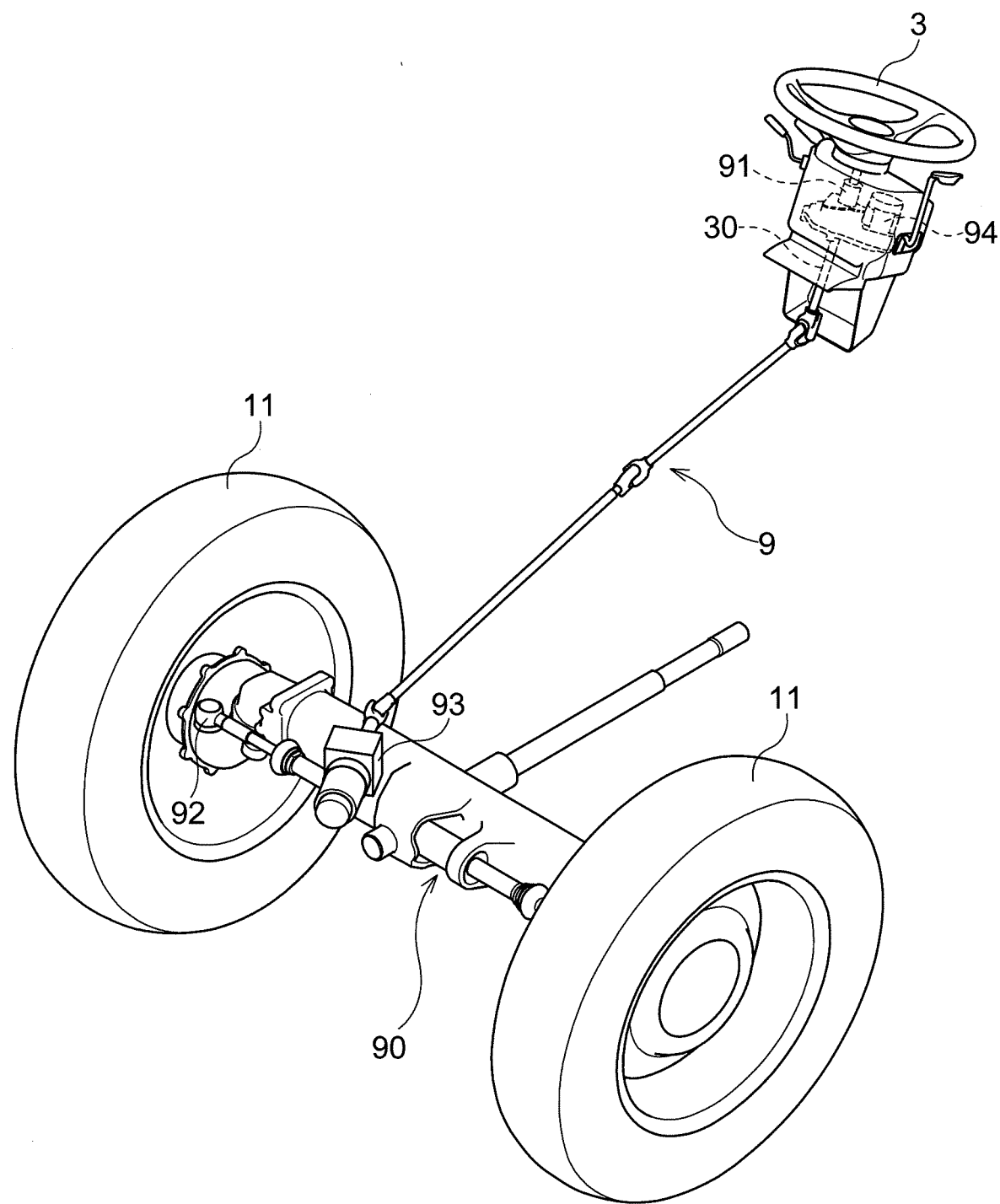
FIG. 3 is a schematic diagram showing a steering mechanism.

FIG. 3 schematically shows a steering mechanism 9 for changing the steering angle of the front wheels 11, which are steerable wheels, based on a wheel angle that is a rotation angle of the steering wheel 3 about a wheel rotation shaft 30. The steering mechanism 9 includes a power steering unit 90 that is coupled to the left and right front wheels 11. A wheel angle detector 91 that detects the wheel angle is provided in the surrounding region of the wheel rotation shaft 30, and a steering angle detector 92 that detects the steering angle of the front wheels 11 is provided in the surrounding region of the power steering unit 90. In the steering mechanism 9, a steering ratio that is a ratio between the wheel angle and the steering angle is not fixed and can be adjusted by an adjusting unit 93. The adjusting unit 93 can be constituted by a mechanical transmission unit that performs variable magnification of a change in the rotation angle to generate the steering angle. If the steering mechanism 9 is constituted by steering-by-wire, the adjusting unit 93 is incorporated into an electronic steering control unit that outputs a steering signal for generating the steering angle corresponding to the wheel angle, to the power steering unit 90.

The tractor is configured to be capable of automatic traveling. Therefore, a steering actuator 94 for automatic steering is provided. The steering actuator 94 operates based on a steering control signal that is transmitted in automatic traveling, and steers the front wheels 11 by rotating the wheel rotation shaft 30 in place of the steering wheel 3.

Figure 4:
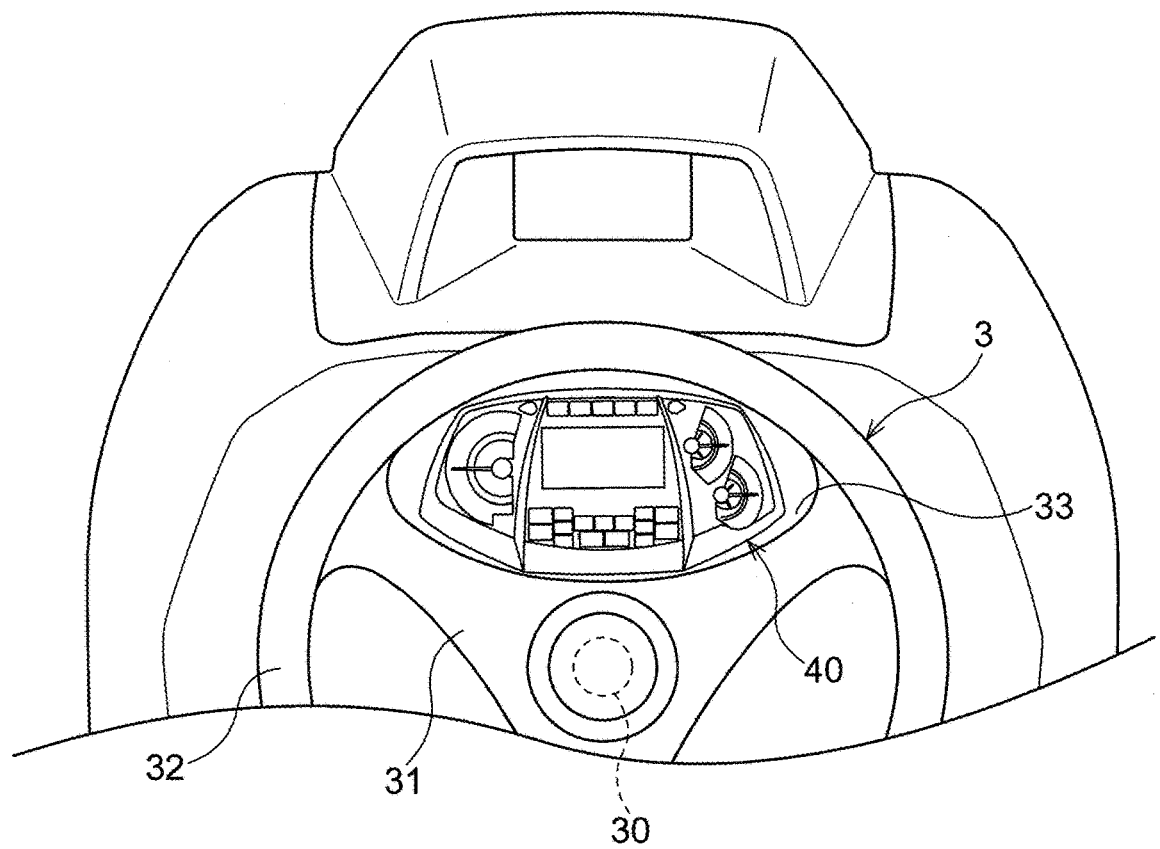
FIG. 4 is a diagram showing a steering wheel and a display unit viewed from the driver seat side.

As shown in FIGS. 2 and 4, the steering wheel 3 is constituted by three spokes 31 that extend in the radial direction of the wheel rotation shaft 30, and a ring-shaped member 32 that is connected to end portions of the spokes 31. The three spokes 31 are arranged at central angle intervals of 120°, and therefore, substantially fan-shaped openings 33 each having a central angle of 120° are formed between the spokes 31 and the ring-shaped member 32. Note that the ring-shaped member 32 does not need to have a complete ring shape, and a portion of the ring-shaped member 32 may be cut out. Also, the number of spokes 31 may be two or four or more, and intervals between the spokes 31 may be nonuniform.

FIG. 4 shows the steering wheel 3 viewed from a driver seated on the driver seat 15. The rotation position of the steering wheel 3 is such that one of the openings 33 is located above the display unit 40. When the steering wheel 3 is at this rotation position, the opening 33 is within the field of view of the driver seated on the driver seat 15, and the driver can see almost the entire screen of the display unit 40 through the opening 33. Here, the wheel angle of the steering wheel 3 at such a rotation position is defined as an appropriate angle.

Figure 5:
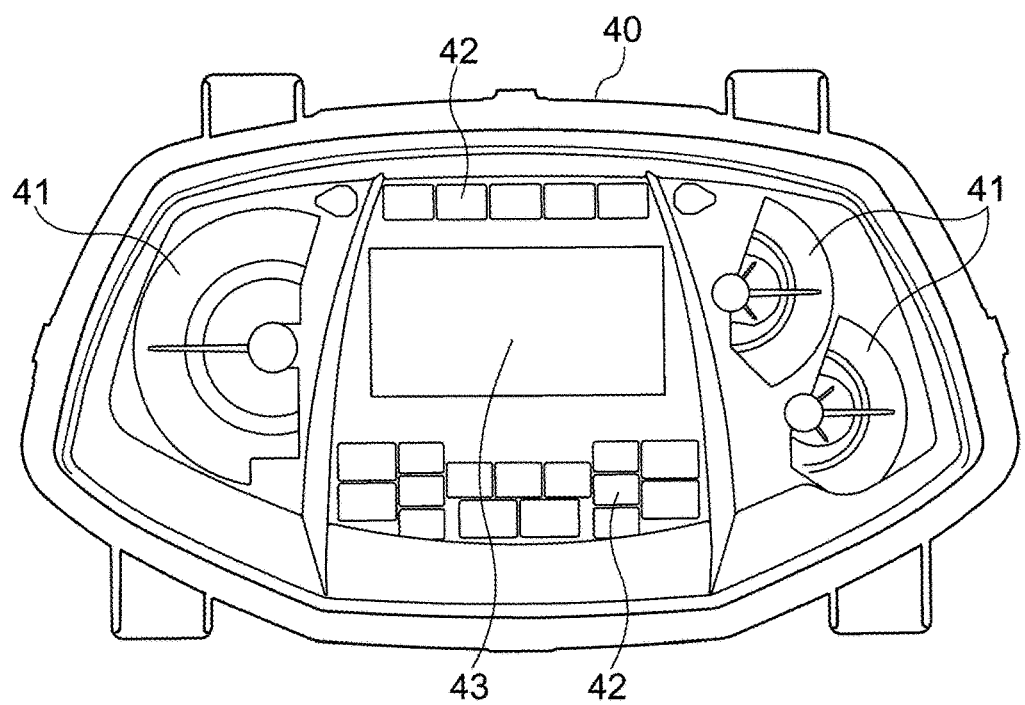
FIG. 5 is a front view of the display unit.

FIG. 5 shows an example of the display unit 40. The display unit 40 in the present preferred embodiment includes a group of meters 41, a group of LED lamps 42, and a liquid crystal panel 43. The group of meters 41 includes a tachometer that is arranged in a left end region and a liquid temperature meter and a fuel meter that are arranged in a right region. The group of LED lamps 42 includes a plurality of LED lamps that are arranged in an upper region and a lower region at the center. These LED lamps serve as various warning lamps and confirmation lamps. Note that the entirety or most of the display screen of the display unit 40 may be constituted by the liquid crystal panel.

At the time of shipment from a factory or maintenance, the steering mechanism 9 (see FIG. 3) is adjusted by the adjusting unit 93 (see FIG. 3) such that, in a state where the wheel angle of the steering wheel 3 is the appropriate angle, the steering angle of the front wheels 11 is a neutral steering angle (which is a steering angle for making the vehicle body 10 travel straight and is 0°). As a result, when the tractor is traveling straight, the driver can have a clear view of information that is displayed in the display unit 40 and is important for traveling of the tractor.

Figure 6:
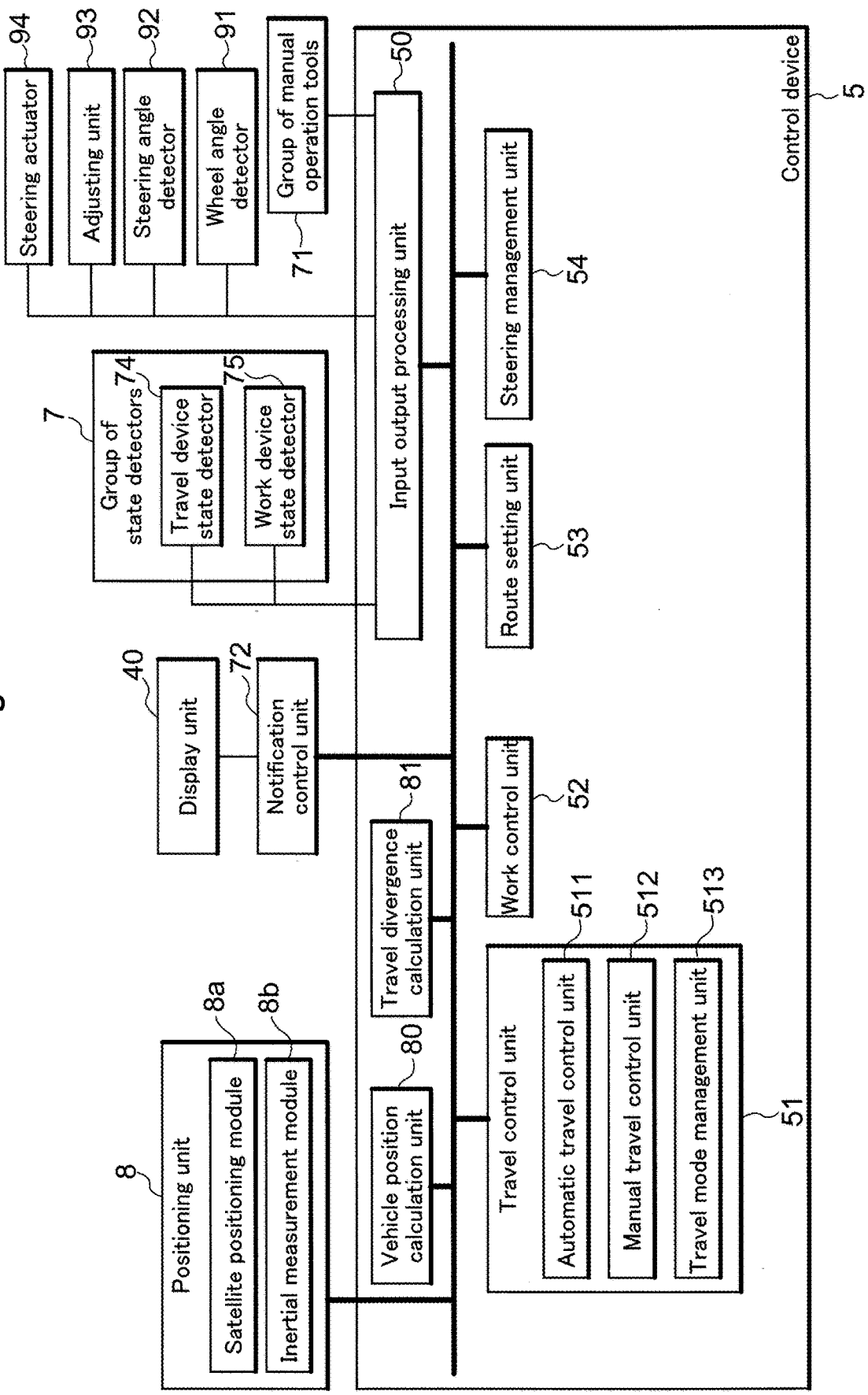
FIG. 6 is a functional block diagram of a control system of the tractor.

Next, main functional units of a control system of the tractor will be described using FIG. 6. The tractor includes a function of automatically traveling along a target travel route, and accordingly, needs to calculate a vehicle position. Therefore, a satellite positioning module 8a and an inertial measurement module 8b are provided as a positioning unit 8. The satellite positioning module 8a is provided in an upper portion of the ROPS 16 as shown in FIG. 1, and adopts the principle of a satellite positioning system (GNSS) for detecting the position of the vehicle body 10 by receiving radio waves from satellites. The inertial measurement module 8b includes a gyroscope sensor and an acceleration sensor, and can determine an angular change in the orientation of the vehicle body. The inertial measurement module 8b may be disposed at a position different from the satellite positioning module 8a, rather than the same position as the satellite positioning module 8a. Of course, the inertial measurement module 8b may be disposed at a different position, for example, the same position as the satellite positioning module 8a.

A control device 5 includes an input output processing unit 50 as an input output interface. The input output processing unit 50 is connected to the wheel angle detector 91, the steering angle detector 92, the adjusting unit 93, and the steering actuator 94 described above. Furthermore, the input output processing unit 50 is connected to a group of state detectors 7, a group of manual operation tools 71, and the like. The positioning unit 8 described above is connected to the control device 5 via an in-vehicle LAN. The display unit 40 displays various types of information based on notification signals from a notification control unit 72.

The group of state detectors 7 is constituted by various sensors and switches, and includes a travel device state detector 74 and a work device state detector 75. The travel device state detector 74 includes sensors that detect the state of travel, such as a vehicle speed sensor, an engine speed sensor, a brake pedal detection sensor, and a parking brake detection sensor (not shown). The work device state detector 75 includes a sensor that detects the state of a work device that the tractor is provided with.

The group of manual operation tools 71 collectively refers to levers, switches, buttons, volume knobs, and the like that are operated by the driver (of which only some are shown in FIG. 2), and control instructions are given to the control device 5 as a result of these tools being operated.

The control device 5 includes a travel control unit 51, a work control unit 52, a route setting unit 53, a steering management unit 54, a vehicle position calculation unit 80, and a travel divergence calculation unit 81, for example.

The vehicle position calculation unit 80 calculates map coordinates (vehicle position) of the vehicle body 10 based on satellite positioning data that is successively transmitted from the positioning unit 8. At this time, the vehicle position calculation unit 80 converts a position that is directly calculated from the satellite positioning data to a reference point of the vehicle body 10 (e.g., the center of the vehicle body or the center of work). The vehicle position calculation unit 80 also includes a function of calculating a traveling direction that is the orientation of the vehicle body 10 in the front-rear direction by chronologically processing the calculated vehicle position.

Based on the vehicle position and the traveling direction calculated by the vehicle position calculation unit 80, the travel divergence calculation unit 81 calculates travel divergence from the target travel route set for automatic traveling. The travel divergence includes a lateral deviation that is a divergence in a lateral direction from the target travel route and a directional deviation that is expressed using an angle formed between the target travel route and the traveling direction.

The travel control unit 51 transmits a steering control signal to the steering actuator 94 and transmits a transmission control signal and a brake control signal to travel devices such as the transmission and the brake. The tractor is capable of automatic traveling and manual traveling, and therefore, the travel control unit 51 includes an automatic travel control unit 511, a manual travel control unit 512, and a travel mode management unit 513.

An automatic travel mode is set to perform automatic driving and a manual travel mode is set to perform manual driving. These travel modes are managed by the travel mode management unit 513. If the automatic travel mode is set, the automatic travel control unit 511 gives a steering control signal to the steering actuator 94 such that the lateral deviation and the directional deviation calculated by the travel divergence calculation unit 81 are reduced.

The work control unit 52 controls operations of the work device (not shown) installed in the vehicle body 10.

The route setting unit 53 calculates a travel route that covers the entire work target area using a program, and sets the travel route as the target travel route according to a determined travel pattern. Note that the travel route may be calculated by another computer or the like, rather than the route setting unit 53 installed in the tractor, and may be transmitted to the route setting unit 53.

The steering management unit 54 gives, to the adjusting unit 93, an adjustment control signal for making the steering angle detected by the steering angle detector 92 be the neutral steering angle in the state where the wheel angle detected by the wheel angle detector 91 is the appropriate angle. The adjusting unit 93 adjusts a relationship between the wheel angle and the steering angle in the steering mechanism 9 (see FIG. 3) based on the adjustment control signal. As a result, when the rotation position of the steering wheel 3 (see FIG. 3) is that of straight travel, almost the entire display unit 40 or at least an important display region of the display unit 40 is inside the opening 33 (see FIG. 4) when viewed from the driver seat side.

Figure 7:
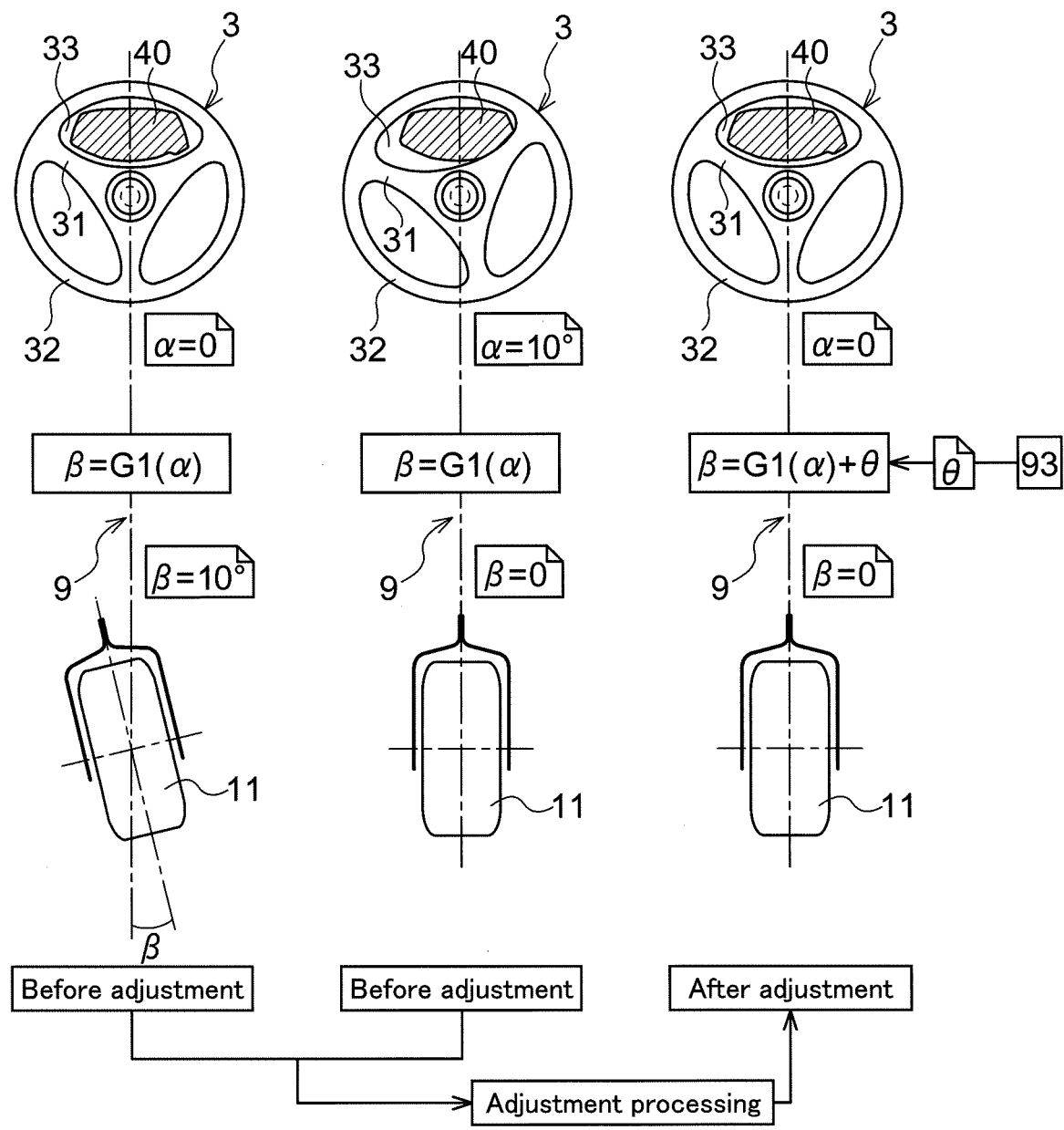
FIG. 7 is a schematic diagram showing steering adjustment of the steering mechanism.

Two states of the steering mechanism 9 before adjustment are schematically shown in the middle portion of FIG. 7. In these states, when the steering wheel 3 is operated by the driver to make the steering angle $\beta$ be the neutral steering angle so that the vehicle body 10 travels in a straight line, the wheel angle $\alpha$ is not the appropriate angle ($=0°$) and the steering wheel 3 deviates from the appropriate angle in the counterclockwise direction. Therefore, a spoke 31 of the steering wheel 3 overlaps the display unit 40, and the driver seated on the driver seat 15 (see FIG. 1) cannot see a portion of the important display region of the display unit 40 through the opening 33.

In other words, if the wheel angle $\alpha$ is set to the appropriate angle so that the important display region of the display unit 40 can be clearly seen through the opening 33, the steering angle deviates from the neutral steering angle and the vehicle body cannot travel in a straight line (see the left diagram in FIG. 7). In order to solve this problem, steering adjustment is performed by the steering management unit 54 (see FIG. 6) and the adjusting unit 93.

The right diagram in FIG. 7 schematically shows a state of the steering mechanism 9 that is adjusted by the adjusting unit 93. Processing for this adjustment is described below. First, when the wheel angle is represented by a, the steering angle is represented by $\beta$, and a steering function for determining the steering ratio in the steering mechanism 9 is represented by G( ) (corresponding to a function or a table), a steering angle that is generated from a wheel angle can be found as follows: $\beta=G(\alpha)$. At the time of shipment from a factory or maintenance, basically, $0°=G(0°)$. If the steering function in the steering mechanism 9 changes from the original steering function G( ) to a changed steering function G1( ) due to damage or the like of the steering wheel 3 or the steering mechanism 9 over time, the steering ratio changes and $0°=G1(0°)$ does not hold true. That is, when the wheel angle is the appropriate angle ($\alpha=0°$), the steering angle is not the neutral steering angle ($\beta=0°$) but 10°, for example. In other words, when the steering angle is the neutral steering angle ($\beta=0°$), the wheel angle is not the appropriate angle ($\alpha=0°$) but 10°, for example.

The adjusting unit 93 and the steering management unit 54 have a function of adjusting the steering mechanism 9 such that $0°=G1 (0°)$ holds true even in the changed steering function G1( ). That is, the steering management unit 54 finds $\theta$ with which $0°=G1 (0°)+\theta$ holds true, and gives adjustment data that corresponds to $\theta$ to the adjusting unit 93. The adjusting unit 93 adjusts the steering mechanism 9 based on the adjustment data. As a result, even in the changed steering function G1( ), the steering angle becomes the neutral steering angle ($\beta=0°$) when the wheel angle is the appropriate angle ($\alpha=0°$).

In a state before the steering mechanism 9 is adjusted, the driver operates an operation tool of the group of manual operation tools 71 that is designated in advance as a trigger switch for adjusting steering. As a result, the processing for adjusting the steering mechanism 9 is executed. In this adjustment processing, the steering mechanism 9 is adjusted by the adjusting unit 93 and the steering management unit 54 (see FIG. 6) to change the steering ratio of the steering mechanism 9 such that the steering angle becomes the neutral steering angle when the wheel angle of the steering wheel 3 is the appropriate angle.

Note that, if the appropriate angle is stored in a memory, the adjusting unit 93 reads out the stored appropriate angle from the memory, and the steering mechanism 9 is adjusted such that the steering angle becomes the neutral steering angle when the wheel angle is the read appropriate angle. This configuration makes it possible to automatically adjust the steering mechanism 9 at a predetermined timing or based on a request from the driver such that the driver can have a clear view of the display unit 40 through the opening 33 when the tractor is traveling in a straight line.

The appropriate angle of the steering wheel 3 may vary depending on the driver. In order to solve this problem, it is possible to adopt a configuration in which the appropriate angle is determined by each driver. In this configuration, an operation tool that is a trigger switch for determining the appropriate angle is designated in advance as an operation tool for setting the appropriate angle, from the group of manual operation tools 71. The wheel angle at a point in time at which this operation tool is operated is set as the appropriate angle, and the steering mechanism 9 is adjusted such that the steering angle becomes the neutral steering angle when the steering wheel has this wheel angle. Thus, the steering angle that makes the steerable wheels travel in a straight line is generated from the wheel angle of the steering wheel 3 at the time when the driver feels that it is easy to see the display unit 40.

Other Preferred Embodiments (1) In the above preferred embodiment, an operation that is made on a manual operation tool is used as a trigger for the steering adjustment performed by the adjusting unit 93 and the steering management unit 54. Instead of this configuration, a configuration may be adopted in which the steering adjustment is automatically executed if it is determined that the vehicle body 10 is traveling in a straight line, based on a chronological change in the orientation of the vehicle body calculated by the vehicle position calculation unit 80, and that the steering adjustment is necessary based on a detected steering angle and a detected wheel angle.

(2) In the above preferred embodiment, the adjusting unit 93 is included in the steering mechanism 9, and the steering management unit 54 is included in the control system. Instead of this configuration, a configuration is also possible in which the steering management unit 54 is also included in the steering mechanism 9.

(3) In the above preferred embodiment, the tractor that is capable of automatic traveling is described, but the present invention is also effective when applied to a work vehicle that is only capable of manual traveling.

INDUSTRIAL APPLICABILITY

The present invention can be advantageously applied particularly to a work vehicle in which the driver seated on the driver seat views a display unit through the steering wheel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle comprising:
a driver seat;
a steerable wheel;
a display to display various types of information;
a steering wheel on a rear side with respect to the display, in front of the driver seat;
a wheel angle detector to detect a wheel angle that is a rotation angle of the steering wheel about a wheel rotation shaft;
a controller to change a steering angle of the steerable wheel based on the wheel angle; and
an adjuster to adjust a relationship between the wheel angle and the steering angle; wherein
the steering wheel includes a plurality of spokes and a ring-shaped portion that is connected to the spokes, and an opening is located between the spokes and the ring-shaped portion; and
the adjuster is configured or programmed to set, as an appropriate angle, the wheel angle that allows the display to be in a field of view from a side of the driver seat through the opening, and adjusts the relationship such that the steering angle becomes a neutral steering angle when the wheel angle is the appropriate angle.

2. The work vehicle according to claim 1, wherein the appropriate angle is stored in advance, the adjuster is configured or programmed to read out the stored appropriate angle, and to adjust the controller based on the read appropriate angle such that the steering angle becomes the neutral steering angle.

3. The work vehicle according to claim 1, wherein the adjuster is configured or programmed to set, as the appropriate angle, a rotation angle of the steering wheel at a point in time at which a manual operation tool to set the appropriate angle is operated, and to adjust the controller such that the steering angle becomes the neutral steering angle when the wheel angle is the appropriate angle.

* * * * *